Aug. 22, 1944.   J. C. WOODFORD   2,356,294
COUNTER RESETTING MECHANISM
Filed March 6, 1941   5 Sheets-Sheet 1
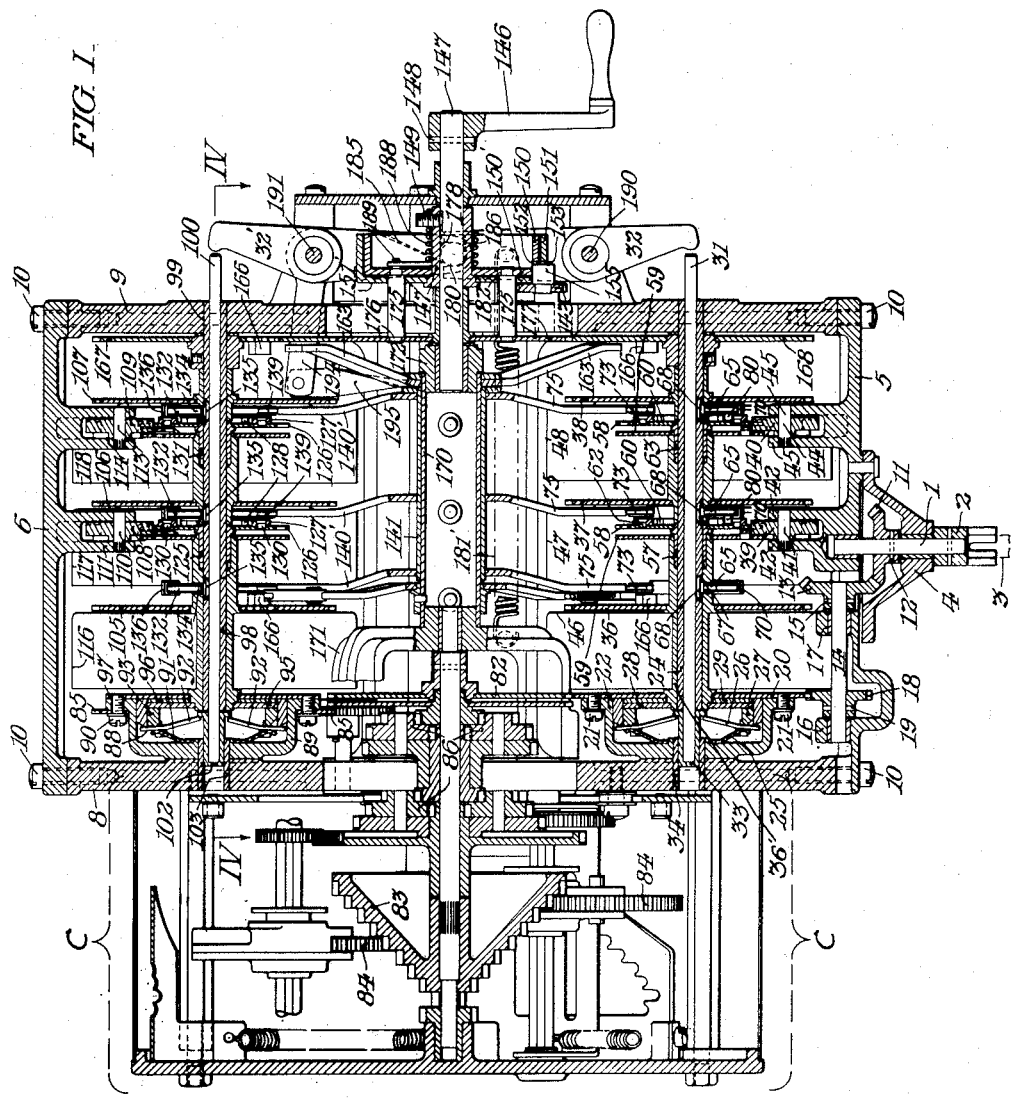
INVENTOR:
JOSEPH C. WOODFORD,
BY
ATTORNEY.

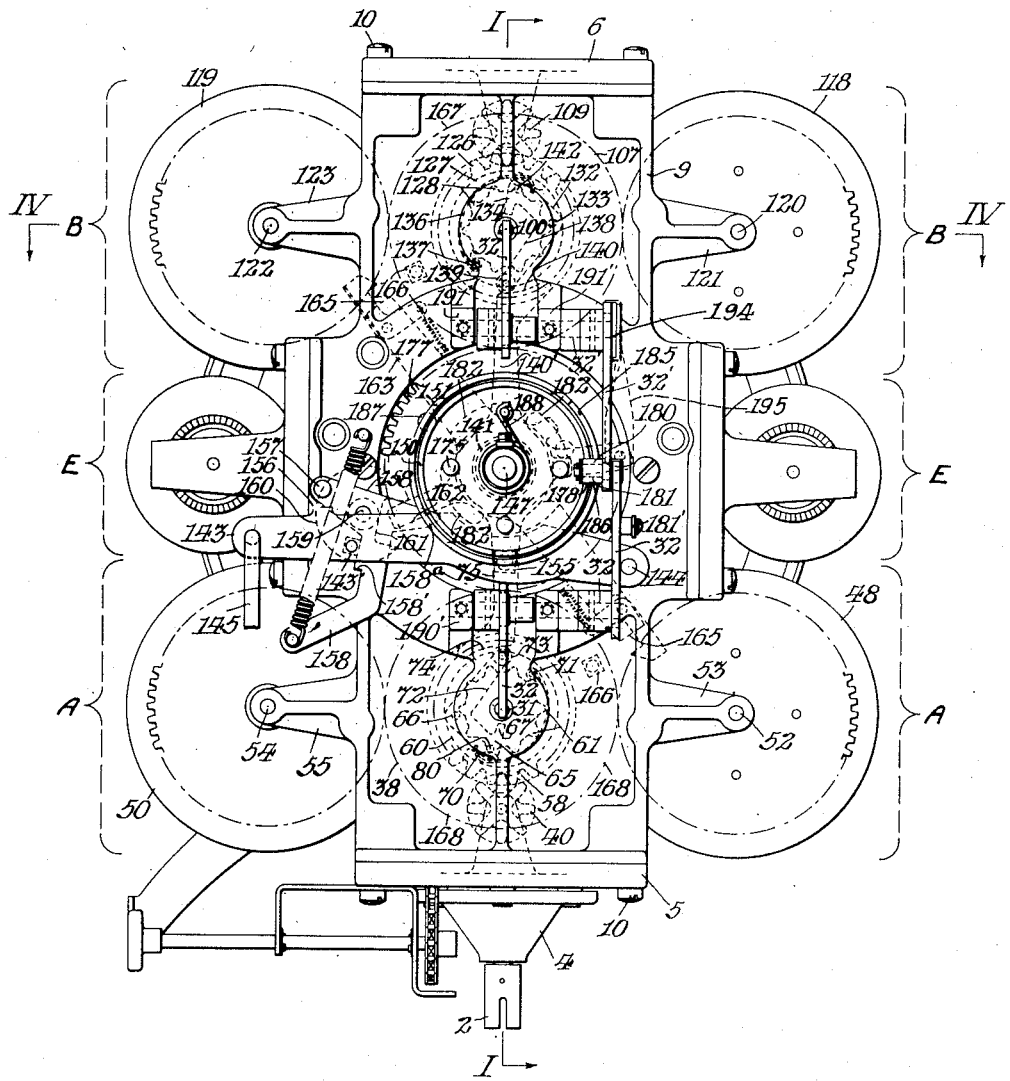

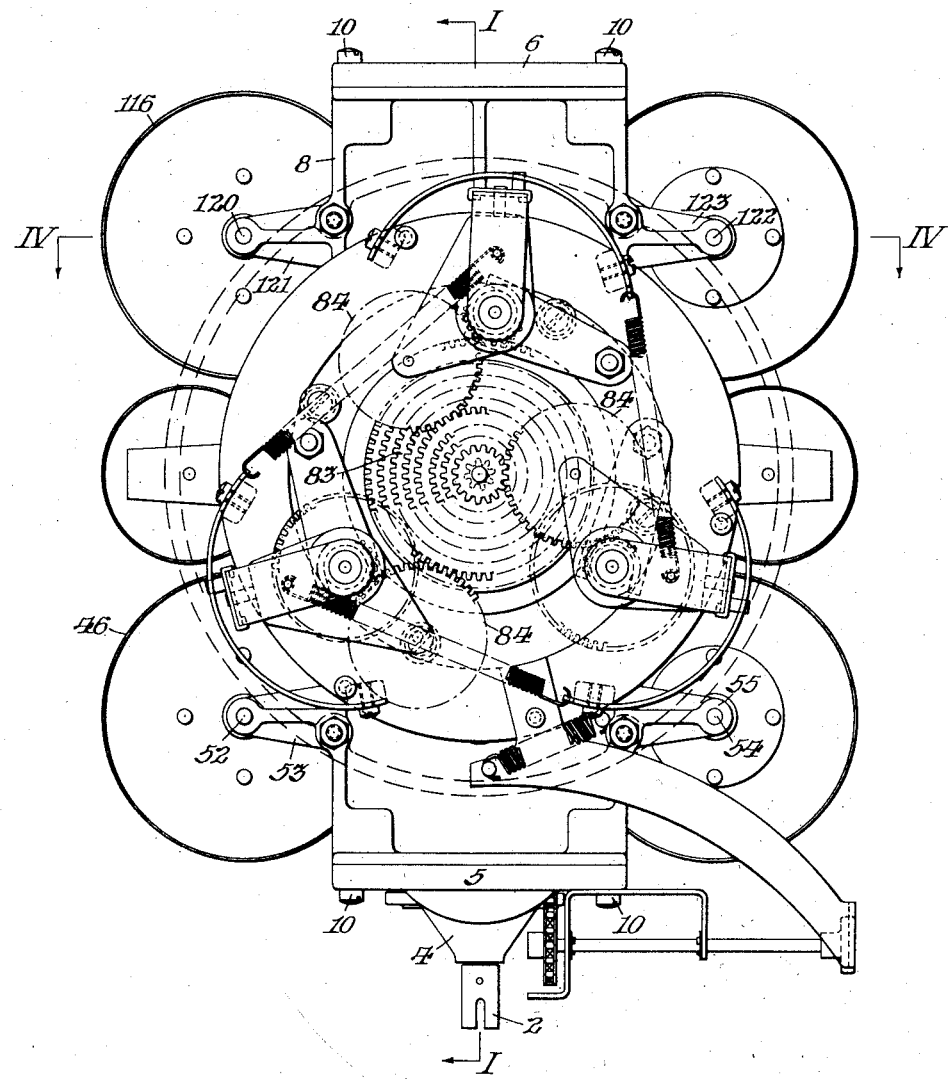
FIG. III.

Aug. 22, 1944.   J. C. WOODFORD   2,356,294
COUNTER RESETTING MECHANISM
Filed March 6, 1941   5 Sheets-Sheet 4
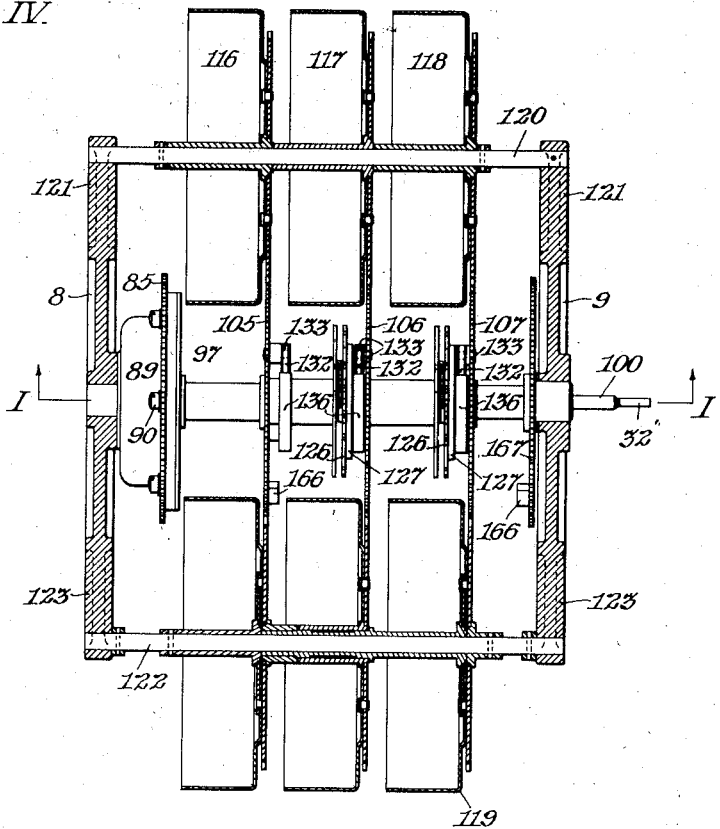
FIG. IV.
INVENTOR:
JOSEPH C. WOODFORD,
BY

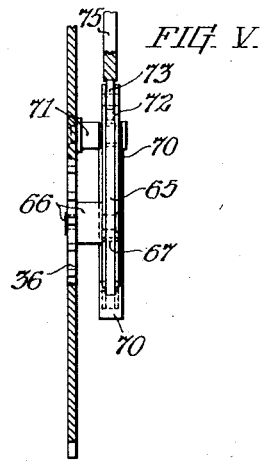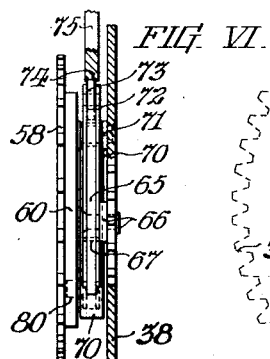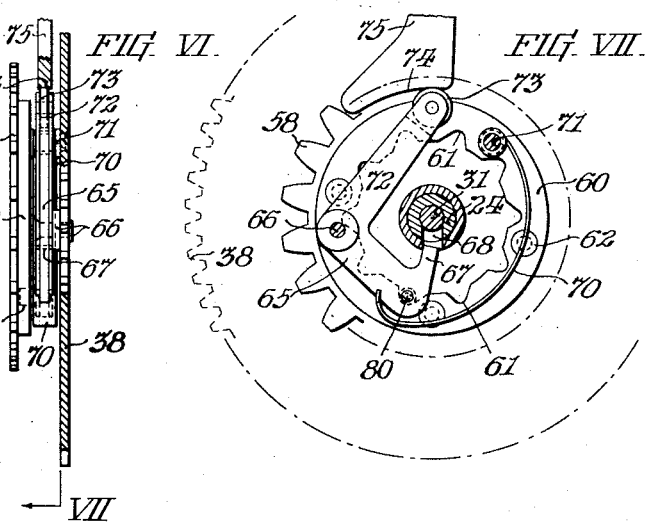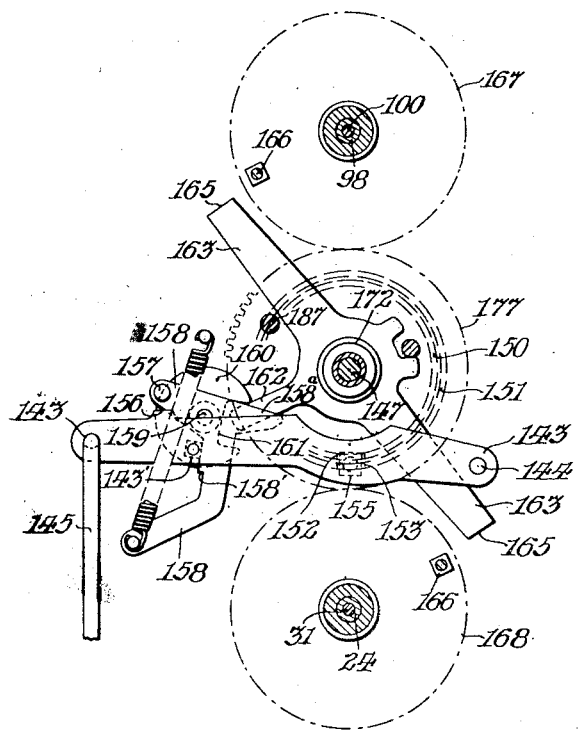

Patented Aug. 22, 1944

2,356,294

UNITED STATES PATENT OFFICE 2,356,294

COUNTER RESETTING MECHANISM

Joseph C. Woodford, Wayne, Pa., assignor to John Wood Manufacturing Company, Inc., Conshohocken, Pa., a corporation of Delaware Application March 6, 1941, Serial No. 381,989

6 Claims. (Cl. 235—144)

My invention relates to counters of the computing type which are particularly adaptable for use in apparatus used for dispensing gasoline into tanks of automobiles. Such counters may be used to indicate the quantity of fluid dispensed, or the total cost thereof, or both. Most of such liquid dispensing apparatus, as currently purchased for use in service stations, include counters adapted to indicate both the quantity and total cost of the gasoline dispensed, and such apparatus also includes a variator which may be preadjusted to compute the cost of the quantity of fluid dispensed in accordance with a visible dial indicated current price.

It is an object of my invention to provide improved resetting mechanism adapted to reset to zero the various wheels of both the counters indicating the quantity and the counters indicating the total cost of the fluid dispensed.

Another object of my invention is to provide resetting mechanism adapted to reset the counter wheels reversely to zero, thereby eliminating the need for shutters. The various weights and measures bureaus require that such counters, if set forward to zero, shall include shutters adapted to conceal the figures on the counter wheels during the resetting to zero operation.

My invention includes the various novel features of construction and arrangement hereinafter more definitely specified.

Fig. I is a vertical section of a computing unit embodying my invention, taken on the lines I, I in Figs. II, III, and IV.

Fig. II is an elevation of the right hand end of the structure shown in Fig. I.

Fig. III is an elevation of the left hand end of the structure shown in Fig. I, but with the side bearing plate removed.

Fig. IV is a plan sectional view, but with the variator mechanism not shown, taken on the lines IV, IV in Figs. I, II, and III.

Fig. V is a fragmentary vertical sectional view, but on a larger scale than Fig. I, showing the manner in which the bell crank pawl is mounted on the gear 36.

Fig. VI is a fragmentary vertical sectional view, but on a larger scale than Fig. I, showing the manner in which the bell crank pawl is mounted on the gear 38.

Fig. VII is a fragmentary elevation, partly in section, taken on the line VII in Fig. VI, and showing the manner in which the pawls engage the arcuate surface of the tracks and the relative positions of the tips of the pawls adapted for engagement in the slotted keyways of the sleeve.

Fig. VIII is an elevation, partly in section, showing the parts of the interlock mechanism indicated in Fig. II, but omitting the elements unrelated thereto as included in Fig. II.

Referring to said drawings; the counter mechanism, conveniently a gallons register for indicating the quantity of fluid dispensed, is indicated generally within the lines carrying the reference mark A. The counter mechanism for indicating the total cost of the quantity of fluid dispensed is indicated generally within the lines carrying the reference mark B. The variator mechanism through which the quantity of fluid dispensed, at a preadjusted price, is translated into total cost, is indicated generally within the lines carrying the reference mark C. The mechanism for indicating the price at which the variator is set to compute is indicated generally by the reference mark E.

The primary drive shaft 1 is adapted to be connected by means of the coupling 2 with the drive shaft 3 of a conventional type of liquid meter as used in liquid dispensing apparatus of the type for which my invention is particularly applicable. Said shaft 1 is journaled in the bearing bracket 4 on the bottom closure plate 5, which forms part of the housing for the counter mechanism. Said housing also includes the upper plate 6 and side frames 8 and 9 conveniently held together by means of a series of screws 10.

Said shaft 1 carries the bevel gear 11 conveniently fastened on said shaft 1 by means of the pin 12. Said bevel gear 11 is in mesh with the bevel gear 13 carried by the shaft 14 and conveniently fastened on said shaft 14 by means of the pin 15. Said shaft 14 is journaled in the bearings 16 and 17 conveniently formed as bosses on said bottom plate 5.

Said shaft 14 carries at its opposite end the gear 18 conveniently fastened on said shaft by means of the pin 19. Said gear 18 is in mesh with the gear 20 rigidly fastened by screws 21 to the housing 22 of the friction clutch of the quantity counter. Said clutch housing 22 is carried by the hub sleeve 36' of the gear 36. Said hub sleeve 36' is mounted with freedom of turning movement on the left hand end of the sleeve, or hollow shaft, 24. The right hand end of said sleeve 24 is journaled in the side frame member 9. The left hand side of said clutch housing 22, as seen in Fig. I, is supported with freedom of turning movement on the bushing 34.

The friction clutch is of a conventional type and includes clutch springs 25, clutch levers 26, pressure ring 27, clutch driving plate 28, and disk 29, which disk is interposed between the clutch plate 28 and said gear 20.

In Fig. I, the elements of the friction clutch are shown in engaged position. With the clutch in engaged position, the gear 20, the clutch housing 22 fastened thereto, the hub sleeve 36', and the gear 36 rigidly fixed on said sleeve 36', turn as a unit upon turning movement of said gear 20.

Said hollow shaft 24 carries the clutch releasing plunger 31, the right hand end of which extends beyond said side frame member 9 for engagement with the bell crank lever 32, as hereinafter described. The plunger rod 31 has mounted on the left hand end thereof the thimble 33 for engagement with the clutch levers 26, when said rod 31 is moved to the left, as hereinafter described. Said thimble 33 is mounted for reciprocal movement in the bushing 34 carried by the left hand side frame member 8.

The counter mechanism, or totalizer, is of ordinary type and is of the well-known Veeder-Root construction. Said counter mechanism, or totalizer, includes the gears 36, 37, and 38; gears 58; two-toothed gears 59; and tens-transfer pinions 39 and 40. Said gears 36, 37, and 38 are in integral relation with their respective hub sleeves 36', 57, and 63, which sleeves are mounted with freedom of turning movement on said hollow shaft 24. The transfer pinion 39 is loosely in integral relation with their respective hub sleeves which are mounted with freedom of turning movement on the shaft 41 rigidly supported in the bosses 42 formed on the bottom closure plate 5. Said transfer pinion 40 is loosely mounted on the shaft 44 rigidly supported in the bosses 45 also formed on the bottom closure plate 5.

Said quantity counter generally indicated at A includes two oppositely counterpart series of numbered wheels, one complete series of which is shown in Fig. I, including the counter wheel 46 of lowest order and conveniently carrying indicia indicating tenths of a gallon; the counter wheel 47 of next higher order, conveniently carrying indicia indicating whole gallons; and the counter wheel 48 of highest order conveniently indicating tens of gallons. The wheel 50 of lowest order of the series at the opposite side is shown in Fig. II. The wheels 46, 47, and 48 are carried on the shaft 52 mounted in brackets 53, one of which is shown in Fig. II. The bank of oppositely counterpart wheels, including the wheel 50 of lowest order, is carried by the shaft 54 mounted in brackets 55, one of which is shown in Fig. II. Necessary gearing connections, identical with those shown in Fig. IV for the total cost register, are provided for connecting the numbered wheels with their gears 36, 37, and 38 of the quantity counter mechanism. Thus, the bank of wheels 46, 47, and 48, and the oppositely counterpart bank including the wheel 50 of lowest order, are connected to their respective drive gears 36, 37, and 38 in the same manner as the two banks of wheels of the total cost counter shown in Fig. IV, hereinafter described.

The sleeve 57, which is mounted to turn on said sleeve 24, has rigidly connected therewith the gear wheel 58 and the ratchet wheel 60, which wheel 60 has a circular series of ten ratchet notches 61, as shown in Figs. II and VII. Said wheels are connected by a series of rivets 62. The sleeve 63, likewise mounted to turn on said sleeve 24, also has connected therewith a similar gear wheel 58 and ratchet wheel 60. As best shown in Figs. V, VI, and VII, each of said gears 36, 37, and 38 carries a bell crank pawl 65 pivotally connected thereto on respective studs 66 rigidly mounted on said respective gears 36, 37, and 38. The pawl tips 67 are adapted to be engaged in notches, or slotted keyways, 68 in said sleeve 24 during the resetting-to-zero operation of the counter. Each of said pawls 65 is spring pressed toward engaging position in its respective notch 68 in said sleeve 24 by means of spring 70, the upper ends of which encircle studs 71 riveted to said gears 36, 37, and 38. Each of said pawls 65 has an extending arm 72 carrying a roller 73 pivotally mounted at the end thereof, and adapted for engagement with the arcuate surface 74 of respective tracks 75 when said tracks 75 are in their engaging positions as shown in Figs. I, II, VI, and VII. When said rollers 73 are thus in engagement with their respective tracks 75, the tips 67 of the pawls 65 are held in non-engaging position with respect to their respective notches 68.

The pawls 65 mounted on said gears 37 and 38 have respective ratchet studs 80, fixed in said pawls, projecting toward the left in Figs. I and VI, so as to engage any one of the notches 61 of their respective ratchet wheels 60 with which the stud registers. Driving connection is thus formed between the indicia carrying counter wheels and the gear wheels 58 during the counting or registering operation of the mechanism.

Said gear 20 engages the gear 82 driving the variator mechanism indicated generally at C, and including the cone gear 83. The variator mechanism illustrated in Fig. I is of the type shown and described in Letters Patent of the United States granted to Slye et al. No. 2,151,239. However, the means for adjusting the variator shown herein are an improvement over that shown in said Slye et al. Letters Patent No. 2,151,239, and such improvement is claimed in my Patent 2,295,819, granted September 15, 1942.

The cone gear 83 drives one or more selector gears 84 which in turn drive the cost value gear 85 through differential or planetary gearing 86. The total cost register indicated generally by the reference mark B is driven through the clutch assembly 88 in the housing 89 on which said gear 85 is rigidly mounted by means of screws 90.

Said clutch 88, similar to the clutch for the quantity register, includes clutch springs 91, clutch levers 92, pressure ring 93, clutch driving plate 95, and disk 96, which disk is interposed between the clutch plate 95 and the end closure plate 97 for said clutch housing 89.

The clutch housing 89 is carried by the left hand end of the sleeve, or hollow shaft, 98, the right hand end of which is journaled in the side frame member 9, as indicated by the reference mark 99.

The hollow shaft 98 carries the clutch releasing plunger 100, the right hand end of which extends beyond the side frame member 9 for engagement with the bell crank lever arm 32', as hereinafter described. The plunger rod 100 has mounted on the left hand end thereof the thimble 102 for engagement with the clutch levers 92, when said rod is moved to the left, as hereinafter described. Said thimble 102 is mounted for reciprocal movement in the bushing 103 carried by the left hand side frame member 8.

The counter mechanism is of ordinary construction and includes the gears 105, 106, and 107, in integral relation with their respective hub sleeves which are mounted with freedom of turning movement on said hollow shaft 98, and the tens-transfer pinions 108 and 109. The transfer pinion 108 is loosely mounted on the shaft 110 rigidly supported in the bosses 111 formed on the top closure plate 6. Said transfer pinion 109 is loosely mounted on the shaft 113 rigidly supported in the bosses 114, also formed on the top closure plate 6.

Said total cost counter generally indicated at B includes two oppositely counterpart series of numbered wheels, one complete series of which is shown in Fig. I, including the wheel 116 of lowest order and conveniently carrying indicia indicating from "0" to "9" cents; the counter wheel 117 of next higher order, conveniently indicating from "0" to "9" tens of cents; and the counter wheel 118 of highest order conveniently indicating from "0" to "9" dollars.

The wheel 119 of lowest order of the series at the opposite side is shown in Fig. II. The wheels 116, 117, and 118 are carried on the shaft 120 mounted in brackets 121, one of which is shown in Fig. II. The bank of oppositely counterpart wheels, including the wheel 119 of lowest order, is carried by the shaft 122 mounted in brackets 123, one of which is shown in Fig. II. Necessary gearing connections are provided for connecting the numbered wheels with their gears 105, 106, and 107 of the total cost register, as shown in Fig. IV.

The sleeve 125, which is mounted to turn on said sleeve 98, has rigidly connected therewith the gear wheel 126 and the ratchet wheel 127. The ratchet wheel 127 has a circular series of ten ratchet notches 128, as shown in Fig. II. Said wheels are connected by a series of rivets 130. The sleeve 131, likewise mounted to turn on the sleeve 98, also has connected therewith a similar gear wheel 126 and ratchet wheel 127.

Each of said gears 105, 106, and 107 carries a bell crank pawl 132 pivotally connected thereto on respective studs 133 rigidly mounted on said respective gears 105, 106, and 107. The pawl tips 134 are adapted to be engaged in notches, or slotted keyways, 135, in said sleeve 98 during the resetting-to-zero operation of the counter. Each of said pawls 132 is spring-pressed toward engaging position in its respective notch 135 in said sleeve 98 by means of a spring 136, the lower ends of which encircle studs 137 riveted to said gears 105, 106, and 107. Each of said pawls 132 has an extending arm 138 carrying a roller 139 pivotally mounted at the end thereof, and adapted for engagement with the arcuate surface 140 of respective tracks 140', integrally connected to the sleeve 141, when said tracks 140' are in their engaging positions shown in Figs. I and II. When said rollers 139 are thus in engagement with their respective arcuate faces 140 of said tracks 140', the tips 134 of the pawls 132 are held in non-engaging position with respect to their respective notches 135.

The pawls 132 mounted on said gears 106 and 107 have respective ratchet studs 142, fixed in said pawls, projecting toward the left in Fig. I, so as to engage any one of the notches 128 of their respective ratchet wheels 127 with which the stud registers. Driving connection is thus formed between the indicia carrying counter wheels and the gear wheels 126 during the counting or registering operation of the mechanism.

The interlock lever 143, pivotally mounted on the stud 144 in the side frame member 9, is connected through a suitable linkage member 145 to the switch controlling the energy to an electric motor which drives the pump to force fluid under pressure through a fluid meter, the drive shaft of which is indicated by the reference mark 3. Both the counters for indicating the quantity of fluid dispensed, generally indicated by the reference mark A, and the total cost counter, generally indicated by the reference mark B, are reset to zero by means of the crank 146 conveniently rigidly connected to the right hand end of the shaft 147 by means of the pin 148.

The cup cam 150 and the cup cam 151 are mounted in telescopic relation on the sleeve 147' connected to said shaft 147 by the set screw 149. Said cup cam 150 is provided with the notch 152 and said cup cam 151 is provided with the notch 153, said notches being in registry when the cams are in the position shown in Figs. I and II. Said lever 143 has the rigid lug 155 adapted to enter the notches 152 and 153 when in registry with each other. When the lever 143 has been moved clockwise upwardly to close the motor switch, the lug 155 enters the notches 152 and 153 of the respective cup cams 150 and 151, and rotation of the crank 146, shaft 147, etc., is prevented during such time as the motor switch remains closed and the motor is running.

Upward movement of the lever 143 to close the motor switch causes the lever extension 156 to engage the stud 157 carried by the spring tensioned lever 158 and turns said lever 158 clockwise and the shaft 159 mounted therein. As best shown in Figs. II and VIII, said lever 158 is provided with the latch 158' for engagement with the lug 143' on said lever 143. The cam 160 is rigidly connected to the shaft 159, and said cam 160 is provided with the notched portion 161. Upward movement of said lever 158 causes said cam 160 to be turned clockwise with the result that the notched portion 161 engages the stop frame lever 162 and turns the series of stop assembly arms 163 counterclockwise to disengage the stops 165 from their respective studs 166 rigidly mounted on the set-back gears 167 and 168 and on said gears 36 and 105. Said stop frame lever 162 and the series of assembly arms 163 are integrally connected to the sleeve 170, the left hand end of which, as shown in Fig. I, is mounted on the bracket 171 connected to the side frame member 8. The right hand end of said sleeve is mounted on the bracket 172 in which the end of the shaft 147 is journaled.

Said cup cam 150 has connected to the web portion 150' thereof a series of studs 175, as shown in Fig. I. The left hand end of said studs 175 are of reduced diameter forming shoulders 176. The set-back gear 177 is mounted on said studs 175 and rigidly connected thereto by riveting over the reduced diameter ends of said studs. Said cup cam 150 is provided with the notch 178 in which the roller 180, mounted for free turning movement on the stud 181 carried by said lever 32', is engaged during the operation of the counter mechanism.

The web portion 151' of said cup cam 151 is provided with a series of arcuate notches 182 through which the studs 175 of the cam 150 project. When the ends of said arcuate slots 182 come into engagement with the studs 175, the cam 150 is picked up and thereafter continued turning movement of said cam 151 will effect simultaneous turning movement of said cam 150 and said set-back gear 177. Said gear 177 is in mesh with the total cost register set-back gear 167 rigidly connected to the hollow shaft 98, and said gear 177 is in mesh with the quantity register set-back gear 168 rigidly connected to the hollow shaft 24.

Said cam 151 is provided with the inclined cam face 185 and a horizontal face 186, which latter face is in registry with the underside of the notch 178 in the cam 150 when said counter mechanism is in operating position, as shown in Figs. I and II. Said cam also carries the stud 187 for engagement with said lever 158 during the resetting operation. A torque spring 188 is provided for said cams, one end of said spring being anchored around an extension 189 formed on the end of one of said studs 175 fixed in said cam 150. The distal end of said spring 188 is fastened to said set screw 149.

The bell crank levers 32 and 32', which respectively engage the clutch releasing plungers 31 and 100, are respectively pivoted at 190 and 191 in the bearing brackets 190' and 191' mounted on said side frame member 9. The arm of said lever 32 is bifurcated to receive the stud 181, the opposite end of which carries the roller 180.

Said lever 32' has connected thereto the lever 194 which is pivotally connected at its left hand end to the depending link 195 connected to the sleeve 141 and tracks 140'. The initial rotation of the set-back crank 146 causes the roller 180 to move to the right in Fig. I, thus moving the lever 32' counterclockwise in Fig. I. Counterclockwise movement of the arm 32' also moves the lever 194 counterclockwise. Such movement of the lever 194 causes clockwise turning movement of the link 195, in a plane at right angles to the plane of said lever 194, and moves the sleeve 141, connected to said link 195, clockwise; thus moving the arcuate track surfaces 74 and 140 from pawl upholding contact with rollers 73 and 139.

*Operation of resetting mechanism*

The counter resetting mechanism operates as follows:

The motor switch operating lever 143 is moved upwardly so that the lug 155 has entered the notches 152 and 153 of the cup cams 150 and 151 so as to prevent turning of the crank 146 while the motor is running. During upward movement of the lever 143, the extension 156 on the lever 143 has pushed the stud 157 of the lever 158 upwardly, turning the shaft 159 clockwise, in Figs. II and VII, so that the cam 160 has turned the stop frame lever 162 and the series of stop assembly arms 163 counterclockwise to disengage the stops 165 from the studs 166. The roller tracks 74 and 140 are in position to engage the pawl rollers 73 and 139 during part of the travel of the rollers and thereby prevent the pawl tips 67 and 134 from entering the slots 68 and 135 of the hollow shafts 24 and 98.

When the hose nozzle of the gasoline dispensing apparatus for which my invention is particularly adaptable for use is open, allowing fluid to flow through the meter, the meter shaft 3 drives the shaft 1 clockwise so as to drive the gear 20 and the quantity register consisting of the conventional transfer gearing and the register wheels 46, 47, and 48 and the oppositely counterpart series of register wheels on the opposite side, including the wheel 50 of lowest order. The clutch gear 20 also drives the gear 82 attached to the center shaft of the cone gear 83. The gear 83 drives one or more selector gears 84 which in turn, through differential or planetary gearing 86, drives the gear 85 of the total cost register. The total cost register gear 85, through the total cost register clutch assembly in the housing 89, drives the total cost register counter generally indicated by the reference mark B, and including the oppositely counterpart series of counter wheels 116, 117, 118, 119, etc.

After the desired quantity of fluid has been dispensed and registered on the quantity register and simultaneously the cost thereof registered on the total cost register, the valve of the dispensing hose nozzle is closed and the motor switch is shut off by counterclockwise movement of the switch operating lever 143. Such downward movement of the lever 143 disengages the lug 155 from the notches 152 and 153 and also allows the lug 143' to be engaged by the latch 158' under the tension of the latch lever spring, and prevents clockwise movement of the lever 143 to again close the motor switch until such time as the registers have been reset to zero.

To reset both the quantity and total cost registers to zero and to unlatch the lever 143 to allow closure of the motor switch, the crank 146 is turned clockwise, in Fig. II, thus first turning the cup cam 151 against tension of the torque spring 188 so that the inclined cam face 185 forces the roller 180 toward the crank, and the bell cranks 32 and 32' are turned on their pivots 190 and 191 moving the plunger rods 31 and 100 to the left so that the thimbles 33 and 102 encounter their respective clutch levers 26 and 92. Said bell cranks 32 and 32' are of stepped shape construction, and said crank 32' has a vertically depending portion, at right angles, at the right hand end of the horizontal portion of the crank and has a vertically upstanding portion, at right angles, at the left hand part of the horizontal portion of said crank, as shown in Fig. II. The bell crank 32 is formed in the same manner, except that it is oppositely counterpart to the configuration of the crank 32'. As the clutch levers 26 and 92 are pressed to the left, the clutch housings 22 and 89 are locked against the adjacent side frame member 8 to prevent the development of any gear train back-lash, and the clutch springs 25 and 91 are deflected, which releases the pressure rings 27 and 93 so that the clutch driving plates 28 and 95 are released, thus permitting the gears 36, 37, 38, 105, 106, and 107 to be set back to zero. During the zeroizing operation with the friction clutches disengaged, the gears 20, 82, and 85 remain stationary, as disengagement of said clutches permits the left hand ends of the respective hub sleeves of the gears 36 and 105, upon rotation thereof, to turn freely in said gears 20 and 85. The lever 194, attached to the upper bell crank 32', turns downwardly at the same time and by means of the link 195 the roller tracks 74 and 140 are turned clockwise out of the course of the pawl rollers 73 and 139 so that the pawl tips 67 and 134 are stressed against the hollow shafts 24 and 98 by their respective springs 70 and 136, regardless of what position the pawls may have been in their course of travel at the time the roller tracks are moved out of support of the rollers.

By continued rotation of the crank, the cup cam 151 continues to turn clockwise until the roller 180 emerges from the notch 178 and the ends of the slots 182 in the web of the cam 151 engage the studs 175 of the cam 150 and begin to drive the set-back gear 177 which is in mesh with the set-back gear 167 of the total cost register and the set-back gear 168 of the quantity register. Such clockwise movement of the gear 177 causes counterclockwise movement of both the counter set-back gears 167 and 168 and their respective hollow shafts 98 and 24 to which said gears 167 and 168 are attached. As the hollow shafts 24 and 98 rotate, the slots 68 and 135 coincide with their respective pawl tips 67 and 134 at various positions, and the ratchet studs 80 and 142 are disengaged from respective notches 61 and 128 in their respective ratchet wheels 60 and 127 as the pawl tips 67 and 134 enter slots 68 and 135, so as to drive the register wheels of both the quantity and total cost counters back to zero position.

Near the end of one complete clockwise revolution of the set-back cam 151, the stud 187, which is carried by said cam 151, encounters the extension 158ª of the lever 158 and turns the shaft 159 counterclockwise, thereby causing the notched portion 161 of the cam 160 to encounter and move the stop frame lever 162 clockwise. Such clockwise movement of the arms 163 causes the stops 165 to engage their respective studs 166 mounted on the set-back gears 167 and 168 and on said gears 36 and 105, thus stopping both the quantity and total cost registers at zero position and also releasing the latch 158' from engagement with the lug 143' mounted on the lever 143.

At this point in the cycle of the resetting operation, the roller 180 is again alined with the notch 178 in the cam 150. When the set-back crank 146 is released from the hand of the operator, the torque spring 188 turns said crank 146 and the cam 151 counterclockwise so that the roller 180 is drawn into the notch by the tension spring 181' fastened to a stud on the lever 32. The distal end of said spring is conveniently fixed on the supporting bracket 171. Such drawing of the roller into the notches causes the engaging tips of the bell crank levers 32 and 32' to be turned clockwise, thereby releasing the plungers 34 and 100 and allowing the clutches in the clutch housings 22 and 89 to again grip their respective driving plates 28 and 95.

Such clockwise movement of the bell crank 32' also moves the lever 194 clockwise, which causes the link 195 to move upwardly, thereby moving the arcuate surfaces 74 and 140 of the respective tracks 75 and 140' counterclockwise, so that said tracks again engage with the pawl rollers 73 and 139, to thus lift the pawl tips 67 and 134 out of engagement with their respective notches 68 and 135; and the transfer gearing mechanism is again connected.

At the end of the resetting operation, the cam notches 152 and 153 are again in line with the lug 155 of the lever 143, so that the lever 143 may be upwardly raised clockwise to close the motor switch. In such position, the stops 165 are still engaged in front of their respective studs 166 but, as hereinabove explained, said stops 165 are moved out of position when the lever 143 is raised to start the motor for the next dispensing operation.

I do not desire to limit myself to the precise details of construction and arrangement above described, as it is obvious that various modifications may be made therein without departing from the essential features of my invention, as defined in the appended claims.

I claim:

1. In counters, the combination with a counting mechanism provided with a resetting mechanism; of driving means for said counting mechanism; clutch mechanism between said driving means and counting mechanism for selectively connecting and disconnecting said driving means with and from said counting mechanisms; a rotatable resetting sleeve provided with pawl engaging notches; means for rotating said sleeve; a pawl operatively connected with each counting mechanism for effecting counter resetting operating connection between said resetting sleeve and counter mechanism; and means for holding said pawl out of operating connection with said notched resetting sleeve during operation of said counter and movable out of pawl upholding position during counter resetting operation.

2. Mechanism as in claim 1, including means connecting said pawl upholding means with said means for rotating said sleeve; whereby said upholding means are operated simultaneously with said means for rotating said sleeve.

3. In counters, the combination with a counting mechanism provided with a resetting mechanism; of driving means for said counting mechanism; clutch mechanism between said driving means and counting mechanism for selectively connecting and disconnecting said driving means with and from said counting mechanisms; a rotatable resetting sleeve provided with pawl engaging notches; means for rotating said sleeve; a pawl operatively connected with each counting mechanism for effecting counter resetting operating connection between said resetting sleeve and counter mechanism; a roller carried by said pawl; and means engaging said pawl roller for holding said pawl out of operating connection with said notched resetting sleeve during operation of said counter and movable out of pawl upholding position during counter resetting operation.

4. In counters, the combination with a counting mechanism provided with a resetting mechanism; of driving means for said counting mechanism; clutch mechanism between said driving means and counting mechanism for selectively connecting and disconnecting said driving means with and from said counting mechanisms; a rotatable resetting sleeve provided with pawl engaging notches; means for rotating said sleeve; a pawl operatively connected with each counting mechanism for effecting counter resetting operating connection between said resetting sleeve and counter mechanism; a roller carried by said pawl; means engaging said pawl roller for holding said pawl out of operating connection with said notched resetting sleeve during operation of said counter and movable out of pawl upholding position during counter resetting operation; and means connecting said pawl upholding means with said means for rotating said sleeve; whereby said upholding means are operated simultaneously with said means for rotating said sleeve.

5. In counters, the combination with a counting mechanism provided with a resetting mechanism; of driving means for said counting mechanism; clutch mechanism between said driving means and counting mechanism for selectively connecting and disconnecting said driving means with and from said counting mechanisms; a rotatable resetting sleeve provided with pawl engaging notches; means for rotating said sleeve; a pawl operatively connected with each counting mechanism for effecting counter resetting operating connection between said resetting sleeve and counter mechanism; a roller carried by said pawl; means engaging said pawl roller for holding said pawl out of operating connection with said notched resetting sleeve during operation of said counter and movable out of pawl upholding position during counter resetting operation; and means connecting said pawl upholding means with said means for rotating said sleeve, including a bell crank lever, an arm connected to said lever, and means connecting said arm with said pawl upholding means; whereby said upholding means are operated simultaneously with said means for rotating said sleeve.

6. In counters, the combination with a counting mechanism provided with a resetting mechanism; of driving means for said counting mechanism; clutch mechanism between said driving means and counting mechanism for selectively connecting and disconnecting said driving means with and from said counting means; clutch operating mechanism including a rod; a rotatable resetting sleeve provided with pawl engaging notches; means for rotating said sleeve, including a shaft and an operating crank therefor; two cams mounted on said shaft; a resetting gear carried by said shaft and means connecting said resetting gear with said rotatable resetting sleeve; a pawl operatively connected with each counting mechanism for effecting counter resetting operating connection between said resetting sleeve and counter mechanism; a roller carried by said pawl; track means for holding said pawl out of operating connection with said notched resetting sleeve during operation of said counter and movable out of pawl upholding position during counter resetting operation; means connecting said pawl upholding means with said means for rotating said sleeve, including a bell crank lever, an arm on said lever, and means connecting said arm with said track means; whereby said track means are operated simultaneously with said means for rotating said sleeve.

JOSEPH C. WOODFORD.

CERTIFICATE OF CORRECTION.

Patent No. 2,356,294.                                               August 22, 1944.

JOSEPH C. WOODFORD.

It is hereby certified that error appears in the printed specification of the above numbered patent requiring correction as follows: Page 2, first column, line 29, after the word "loosely" insert --mounted--; same line, beginning with "in" strike out all to and including "movement" in line 32; and that the said Letters Patent should be read with this correction therein that the same may conform to the record of the case in the Patent Office.

Signed and sealed this 26th day of June, A. D. 1945.

Leslie Frazer (Seal)                                Acting Commissioner of Patents.